US006947749B2

(12) United States Patent
Lim (10) Patent No.: US 6,947,749 B2
(45) Date of Patent: Sep. 20, 2005

(54) APPARATUS FOR INCREASING CELL CAPACITY IN MOBILE COMMUNICATION SYSTEM USING ADAPTIVE SECTORIZATION AND METHOD FOR CONTROLLING THE SAME

(75) Inventor: Sang Hoon Lim, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 448 days.

(21) Appl. No.: 10/303,334

(22) Filed: Nov. 25, 2002

(65) Prior Publication Data

US 2004/0023657 A1 Feb. 5, 2004

(30) Foreign Application Priority Data

Jul. 19, 2002 (KR) ........................................ 2002-42431

(51) Int. Cl.[7] .............................................. H04M 1/00
(52) U.S. Cl. ................. 455/452.1; 455/562.1
(58) Field of Search ............................. 455/452.1, 450, 455/562.1

(56) References Cited

U.S. PATENT DOCUMENTS

| | | | | | |
|---|---|---|---|---|---|
| 4,881,082 | A | * | 11/1989 | Graziano | 342/432 |
| 5,276,907 | A | * | 1/1994 | Meidan | 455/436 |
| 5,565,873 | A | * | 10/1996 | Dean | 342/372 |
| 5,649,293 | A | * | 7/1997 | Reed | 455/453 |
| 6,070,090 | A | * | 5/2000 | Feuerstein | 455/562 |
| 6,101,399 | A | * | 8/2000 | Raleigh et al. | 455/561 |
| 6,104,930 | A | * | 8/2000 | Ward et al. | 455/450 |
| 6,330,459 | B1 | * | 12/2001 | Crichton et al. | 455/562.1 |
| 6,418,327 | B1 | * | 7/2002 | Carey et al. | 455/562.1 |
| 6,594,496 | B2 | * | 7/2003 | Schwartz | 455/509 |
| 6,718,184 | B1 | * | 4/2004 | Aiken et al. | 455/562.1 |
| 2004/0196800 | A1 | * | 10/2004 | Padovani et al. | 370/321 |

* cited by examiner

Primary Examiner—Joseph Mancuso
Assistant Examiner—Ariel Balaoing
(74) Attorney, Agent, or Firm—McDonnell Boehnen Hulbert & Berghoff LLP (57) ABSTRACT

An apparatus for increasing a cell capacity in a mobile communication system using an adaptive sectorization and a method for controlling the same. The apparatus comprises an adaptive sector unit for converting radio frequency (RF) signals of two forward paths into beam signals of m forward paths in a forward link and beam signals of m reverse paths into RF signals of two reverse paths in a reverse link in consideration of a user distribution of each sector based on a received signal strength indicator (RSSI) of each sector, respectively, an analog beam former for forming a multi-beam of fixed beams y and variable beams x for each sector, and converting beam signals into antenna signals in the forward link and antenna signals into beam signals in the reverse link, respectively, a power amplifier for power-amplifying antenna signals of n forward paths for each sector from the analog beam former, and a front-end unit for, in the forward link, receiving n-path antenna signals of each sector from the power amplifier and transmitting the received antenna signals through a multi-array antenna module for each sector, and for, in the reverse link, receiving n-path antenna signals from the multi-array antenna module for each sector and performing noise removal and filtering functions with respect to the received antenna signals.

13 Claims, 9 Drawing Sheets

APPARATUS FOR INCREASING CELL CAPACITY IN MOBILE COMMUNICATION SYSTEM USING ADAPTIVE SECTORIZATION AND METHOD FOR CONTROLLING THE SAME

BACKGROUND OF THE INVENTION

1. Field of the Invention

The present invention relates to an apparatus for increasing a cell capacity in a mobile communication base station and a method for controlling the same, and more particularly to an apparatus for increasing a cell capacity in a mobile communication system using an adaptive sectorization and a method for controlling the same, wherein the adaptive sectorization is applied to a mobile communication base station to improve an inter-sector traffic imbalance resulting from a user distribution in a cell so as to increase the cell capacity.

2. Description of the Related Art

A smart antenna technique and adaptive sectorization have recently been developed to be applied to a mobile communication base station system to increase a cell capacity. The smart antenna technique is superior in performance to the adaptive sectorization.

However, in order to apply the smart antenna technique to a base station, a modem and transceiver must be redesigned for application of an adaptive beam former, and the transceiver must be increased in capacity to process signals on an extending antenna path. The smart antenna technique necessitates a variety of additional functions, such as a diversity function, a steering function, a tilting function, a cell configuration change function based on transmission/reception power control, etc., besides functions essential to an increase in base station capacity, thereby making the base station very complicated in construction, and considerably hard to design and implement, resulting in difficulties in operating the base station.

Accordingly, in the mobile communication field, the smart antenna technique is not applied to the base station due to difficulties in implementing the base station, although it is superior in performance to the adaptive sectorization.

Meanwhile, the adaptive sectorization is a technique for controlling a sector size adaptively to a given environment using a multi-array antenna. This technique is applicable to cellular mobile communication base stations of a code division multiple access (CDMA) system, a time division multiple access (TDMA) system and a wireless local loop (WLL) system.

Effects of a capacity increase by the adaptive sectorization will hereinafter be described in more detail with reference to an example. Assuming that the total capacity of one sector is N, the capacity of a cell composed of three sectors is 3N. However, provided that the cell has such a nonuniform user distribution that 2N users are concentrated in a specific one of the three sectors and N users are spread over the remaining two sectors, the current capacity of the cell will become 2N because the capacity of one sector is no more than N although the total capacity of the cell is 3N. In this case, if the adaptive sectorization is used to reduce the size of the sector concentrated with 2N users to N and allocate 2N users to the other two sectors, the cell can provide services at its original maximum capacity, in that it has a capacity of 3N, owing to the sector size adjustment, although the user distribution is subject to no variation. However, in order to apply the adaptive sectorization to a mobile communication system, there is a need to modify internal constituent elements and the structure of the system, which leads to technical difficulties causing difficulties in use.

Figure 1:
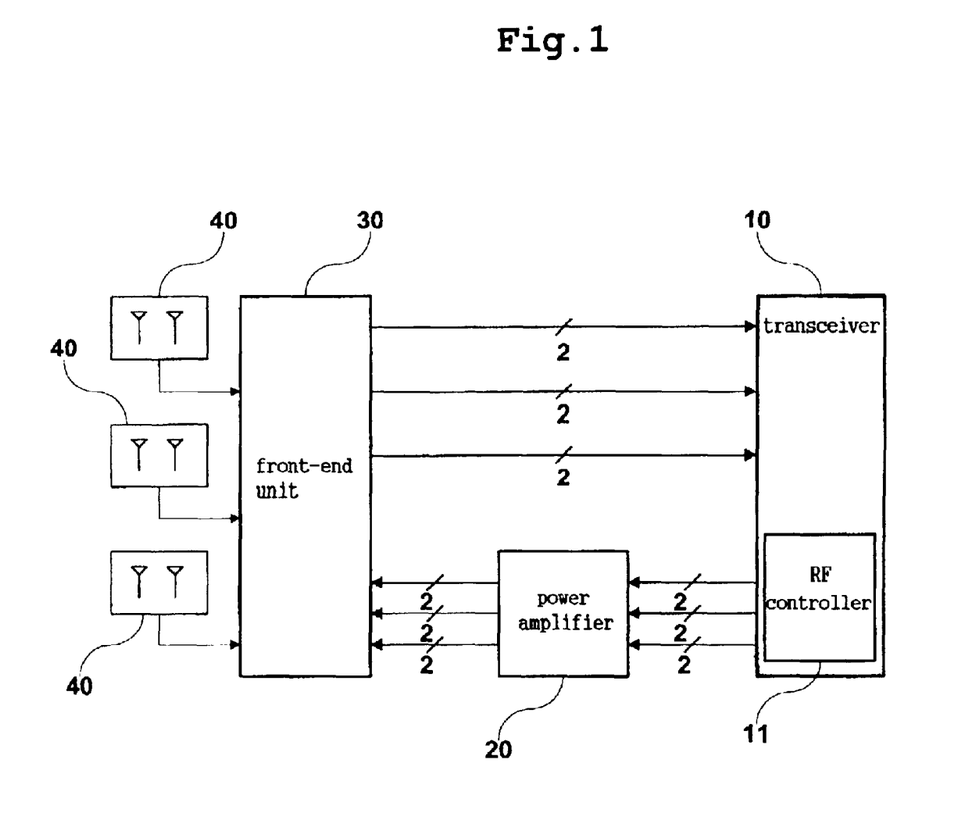
FIG. 1 is a functional block diagram showing the construction of a conventional fixed 3-sector base station.
Figure 2:
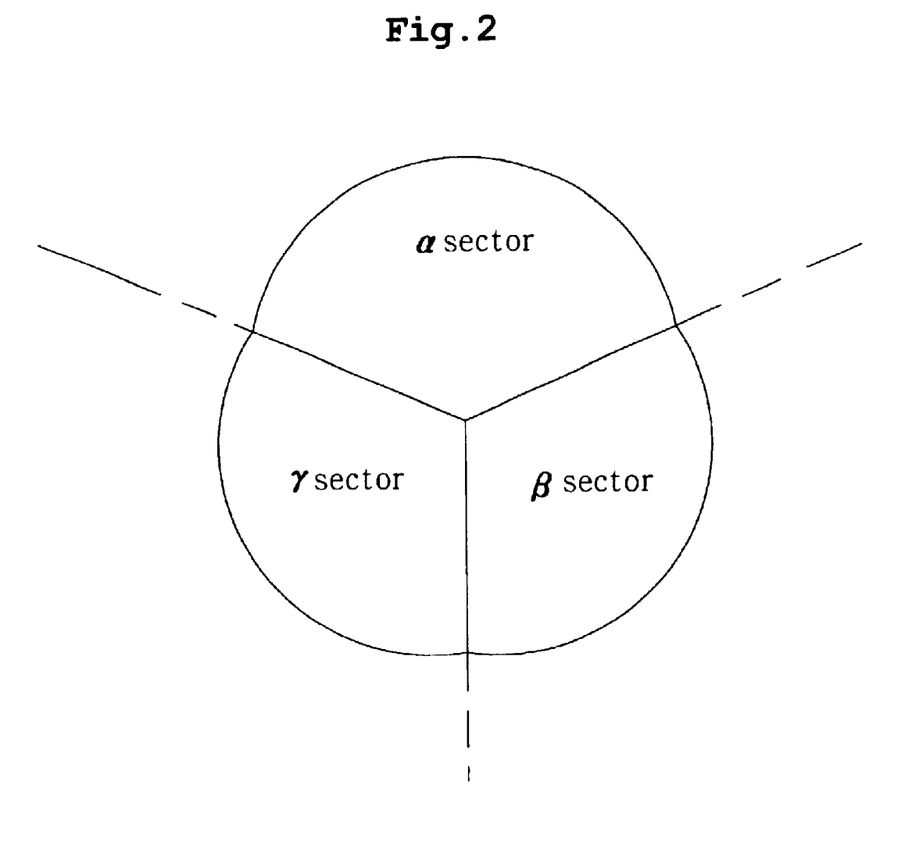
FIG. 2 is a view showing a conventional fixed 3-sector cell configuration.

On the other hand, a conventional mobile communication 3-sector base station comprises, as shown in FIG. 1, a transceiver 10 including a radio frequency (referred to hereinafter as RF) controller 11. The transceiver 10 acts to perform functions for transmission/reception of data to/from a base station controller, such as a data digital/analog (D/A) conversion function, an up/down conversion function, a modulation/demodulation function, etc. The conventional mobile communication 3-sector base station further comprises a power amplifier 20 for receiving and amplifying an RF signal from the transceiver 10, a front-end unit (FEU) 30 for performing a noise removal function upon transmission and reception of RF signals, and a plurality of diversity antenna modules 40, each having two antennas for a corresponding sector. The conventional mobile communication 3-sector base station has a fixed 3-sector cell structure as shown in FIG. 2.

However, the above-mentioned conventional fixed 3-sector base station has a disadvantage in that the capacity of a cell is reduced due to an inter-sector traffic imbalance resulting from a user distribution in the cell, causing a significant reduction in the quality of speech.

SUMMARY OF THE INVENTION

Therefore, the present invention has been made in view of the above problems, and it is an object of the present invention to provide an apparatus for increasing a cell capacity in a mobile communication system using an adaptive sectorization and a method for controlling the same, wherein the adaptive sectorization is applied to a mobile communication base station to improve an inter-sector traffic imbalance resulting from a user distribution in a cell so as to increase the cell capacity.

It is another object of the present invention to provide an apparatus for increasing a cell capacity in a mobile communication system using an adaptive sectorization and a method for controlling the same, wherein an analog beam former is used for application of the adaptive sectorization to a mobile communication base station so that the adaptive sectorization is applicable with no modification of internal constituent elements of the base station to curtail hardware costs, and it is also used at a stage upstream of a power amplifier to reduce a phase error.

In accordance with one aspect of the present invention, the above and other objects can be accomplished by the provision of an apparatus for increasing a cell capacity in a mobile communication system using an adaptive sectorization, the mobile communication system including a base station system having a plurality of sectors, the base station system including a transceiver for performing a variety of functions associated with transmission/reception of data, the transceiver including a radio frequency (RF) controller, the apparatus comprising: an adaptive sector unit for determining a user distribution of each of the sectors on the basis of a received signal strength indicator (RSSI) of each of the sectors from the RF controller, for, in a forward link, receiving RF signals of two forward paths for each of the sectors from the transceiver, switching paths corresponding to variable beams of each of the sectors from one of the sectors with a highest one of the user distributions to another one of the sectors with a lowest one of the user distributions in consideration of the respective user distributions of the sectors to generate beam signals of m forward paths for each of the sectors, and outputting the generated beam signals, and for, in a reverse link, receiving beam signals of m reverse paths, containing y fixed beam paths, for each of the sectors, mixing the received beam signals into ones of two reverse paths and outputting the resulting signals to the transceiver; an analog beam former for, in the forward link, receiving the beam signals of the m forward paths for each of the sectors from the adaptive sector unit, converting the received beam signals into antenna signals of n forward paths for each of the sectors to form a multibeam of fixed beams and variable beams for each of the sectors, and outputting the resulting antenna signals, and for, in the reverse link, receiving antenna signals of n reverse paths for each of the sectors, converting the received antenna signals into the beam signals of the m reverse paths and outputting the resulting beam signals to the adaptive sector unit; a power amplifier for power-amplifying the antenna signals of the n forward paths for each of the sectors from the analog beam former and outputting the resulting signals; and a front-end unit for, in the forward link, receiving n-path antenna signals of each of the sectors from the power amplifier and transmitting the received antenna signals through λ/3 antennas for each of the sectors, and for, in the reverse link, receiving n-path antenna signals from the λ/3 antennas for each of the sectors, performing noise removal and filtering functions with respect to the received antenna signals and outputting the resulting signals to the analog beam former over the n reverse paths for each of the sectors.

In accordance with another aspect of the present invention, there is provided a method for controlling an apparatus for increasing a cell capacity in a mobile communication system using an adaptive sectorization, by means of an adaptive sector processor of an adaptive sector unit, the method comprising the steps of: a) recognizing that a given base station is a 2-sector base station having an alpha sector and a beta sector and that the alpha sector and beta sector are each allocated four fixed beams and two variable beams; b) receiving respective RSSIs of the sectors from an RF controller, recognizing on the basis of the received RSSIs that the alpha sector has a higher user distribution than that of the beta sector, and calculating a difference of the RSSI of the beta sector from the RSSI of the alpha sector; c) determining whether the RSSI of the alpha sector is greater than a first predetermined threshold value and the difference of the RSSI of the beta sector from the RSSI of the alpha sector is greater than a second predetermined threshold value; d) ending an entire operation if it is determined at the step c) that the RSSI of the alpha sector is not greater than the first predetermined threshold value, or the difference of the RSSI of the beta sector from the RSSI of the alpha sector is not greater than the second predetermined threshold value, and determining whether both two variable beams at left boundary areas of the alpha and beta sectors have been allocated to the beta sector, if it is determined at the step c) that the RSSI of the alpha sector is greater than the first predetermined threshold value and the difference of the RSSI of the beta sector from the RSSI of the alpha sector is greater than the second predetermined threshold value; e) determining whether both two variable beams at right boundary areas of the alpha and beta sectors have been allocated to the beta sector, if it is determined at the step d) that both the two variable beams at the left boundary areas of the alpha and beta sectors have been allocated to the beta sector; and f) allocating one of the two variable beams at the right boundary areas of the alpha and beta sectors to the beta sector if it is determined at the step e) that neither of the two variable beams at the right boundary areas of the alpha and beta sectors has been allocated to the beta sector.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
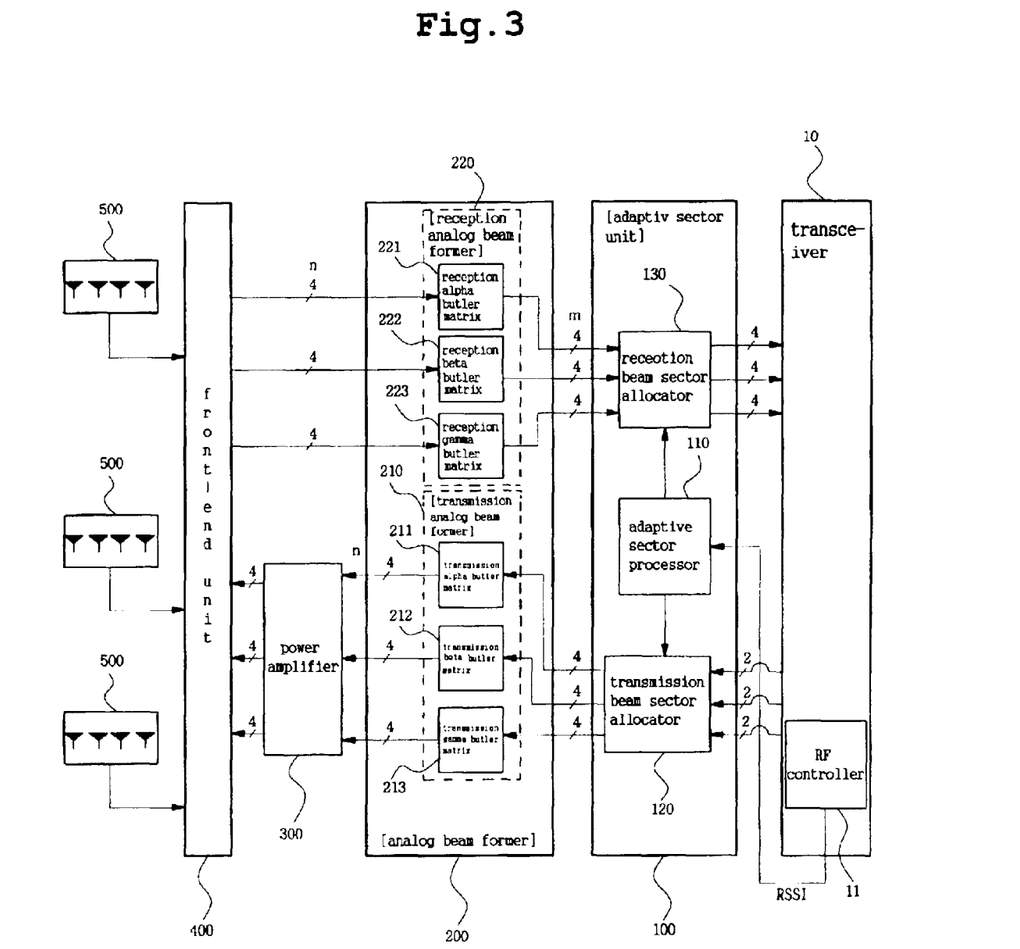
FIG. 3 is a functional block diagram showing the construction of an apparatus for increasing a cell capacity in a mobile communication 3-sector base station system using an adaptive sectorization in accordance with a preferred embodiment of the present invention.

FIG. 3 is a functional block diagram showing the construction of an apparatus for increasing a cell capacity in a mobile communication 3-sector base station system using an adaptive sectorization in accordance with a preferred embodiment of the present invention. As seen from this drawing, the present invention is applied to a base station having three sectors, an alpha (α) sector, beta (β) sector and gamma (γ) sector, each being allocated two fixed beams and two variable beams.

With reference to FIG. 3, the cell capacity increasing apparatus comprises an adaptive sector unit 100, an analog beam former 200, a power amplifier 300 and a front-end unit (FEU) 400.

The adaptive sector unit 100 is adapted to, in a forward link, determine a user distribution of each of the sectors on the basis of a received signal strength indicator (referred to hereinafter as RSSI) of each of the sectors from the RF controller 11 in the transceiver 10, receive RF signals of two forward paths for each of the sectors from the transceiver 10, switch paths corresponding to variable beams of each of the sectors from one of the sectors with a highest one of the user distributions to another one of the sectors with a lowest one of the user distributions in consideration of the respective user distributions of the sectors to generate beam signals of m forward paths for each of the sectors, and output the generated beam signals to the analog beam former 200.

The adaptive sector unit 100 is also adapted to, in a reverse link, receive beam signals of m reverse paths, containing y fixed beam paths, for each of the sectors from the analog beam former 200, mix the received beam signals into ones of two reverse paths and output the resulting signals to the transceiver 10.

The adaptive sector unit 100 includes, as shown in FIG. 3, an adaptive sector processor 110, a transmission beam sector allocator 120 and a reception beam sector allocator 130.

The adaptive sector processor 110 in the adaptive sector unit 100 acts to determine the user distribution of each of the sectors on the basis of the RSSI of each of the sectors from the RF controller 11, generate a switching control signal in accordance with the determined result to switch the paths corresponding to the variable beams of each of the sectors, and output the generated switching control signal to each of the transmission beam sector allocator 120 and reception beam sector allocator 130.

Figure 4:
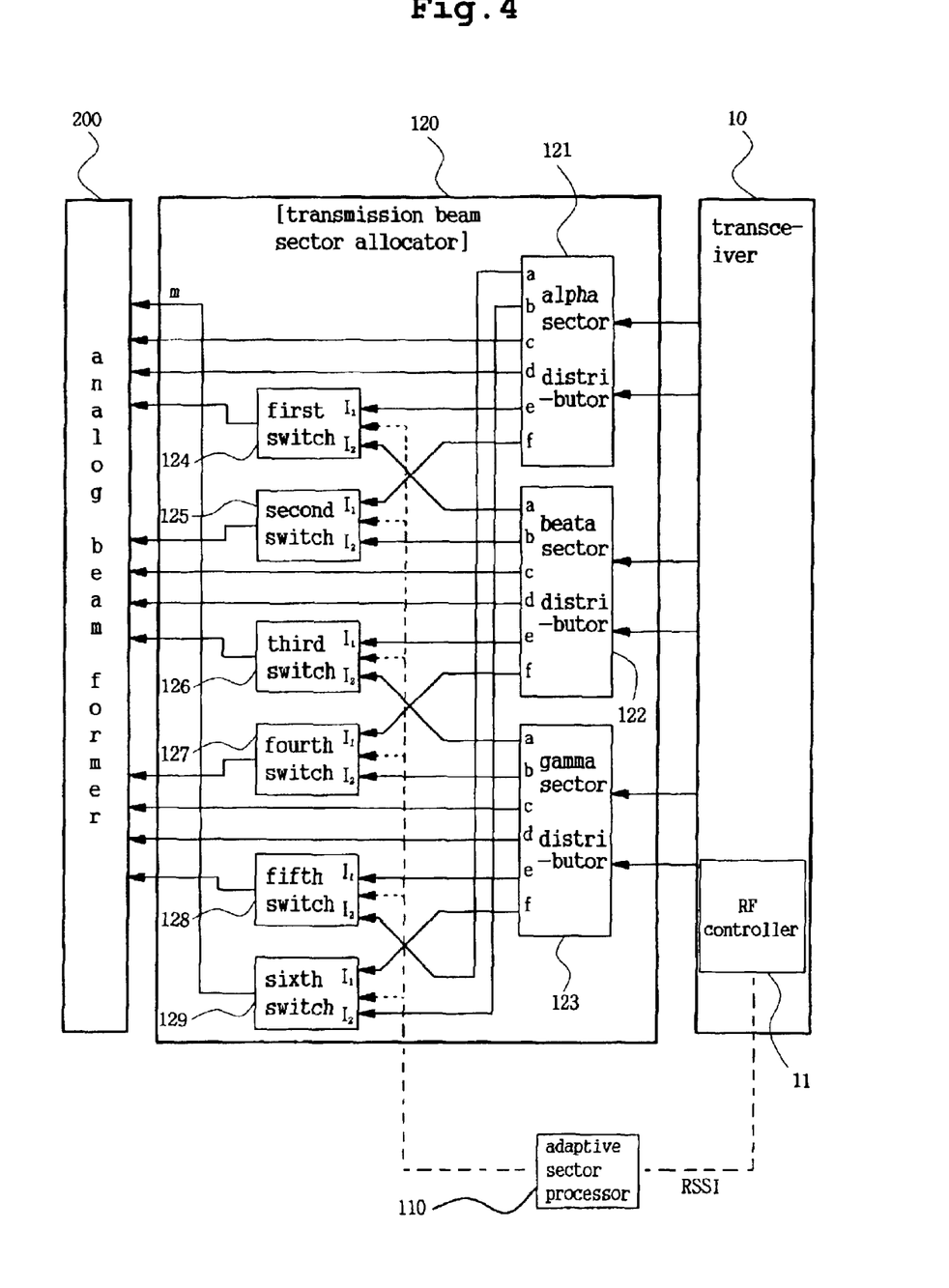
FIG. 4 is a functional block diagram showing an internal structure of a transmission beam sector allocator in the cell capacity increasing apparatus of FIG. 3.

The transmission beam sector allocator 120 in the adaptive sector unit 100 acts to receive the RF signals from the transceiver 10 over the two forward paths for each of the sectors, distribute the received RF signals into the same number of paths for each of the sectors as the total number (k=6) of fixed beams and variable beams of each of the sectors and neighbor sector variable beams, switch the paths corresponding to the variable beams of each of the sectors in response to the switching control signal from the adaptive sector processor 110 to generate the beam signals of the m forward paths for each of the sectors, and output the generated beam signals to the analog beam former 200. To this end, the transmission beam sector allocator 120 includes, as shown in FIG. 4, an alpha (α) sector distributor 121, a beta (β) sector distributor 122, a gamma (γ) sector distributor 123, a first switch 124, a second switch 125, a third switch 126, a fourth switch 127, a fifth switch 128 and a sixth switch 129.

The alpha sector distributor 121 in the transmission beam sector allocator 120 has its output terminals a and b connected respectively to input terminals $I_2$ of the fifth and sixth switches 128 and 129, its output terminals c and d connected respectively to alpha fixed beam input terminals of the analog beam former 200, and its output terminals e and f connected respectively to input terminals $I_1$ of the first and second switches 124 and 125. The alpha sector distributor 121 acts to receive the RF signals over the two forward paths from alpha sector output terminals of the transceiver 10, distribute the received RF signals into the k=6 paths and output the distributed signals respectively to the corresponding switches 124, 125, 128 and 129 and the analog beam former 200 through its output terminals a, b, c, d, e and f. At this time, signals at the output terminals a, b, e and f are passed through the switches 128, 129, 124 and 125, respectively, in a different manner from signals at the output terminals c and d. In this regard, the alpha sector distributor 121 also functions to compensate for phase and amplitude differences between the signals at the output terminals a, b, e and f and the signals at the output terminals c and d.

The beta sector distributor 122 in the transmission beam sector allocator 120 has its output terminals a and b connected respectively to input terminals $I_2$ of the first and second switches 124 and 125, its output terminals c and d connected respectively to beta fixed beam input terminals of the analog beam former 200, and its output terminals e and f connected respectively to input terminals $I_1$ of the third and fourth switches 126 and 127. The beta sector distributor 122 acts to receive the RF signals over the two forward paths from beta sector output terminals of the transceiver 10, distribute the received RF signals into the k=6 paths and output the distributed signals respectively to the corresponding switches 124, 125, 126 and 127 and the analog beam former 200 through its output terminals a, b, c, d, e and f. At this time, signals at the output terminals a, b, e and f are passed through the switches 124, 125, 126 and 127, respectively, in a different manner from signals at the output terminals c and d. In this regard, the beta sector distributor 122 also functions to compensate for phase and amplitude differences between the signals at the output terminals a, b, e and f and the signals at the output terminals c and d.

The gamma sector distributor 123 in the transmission beam sector allocator 120 has its output terminals a and b connected respectively to input terminals $I_2$ of the third and fourth switches 126 and 127, its output terminals c and d connected respectively to gamma fixed beam input terminals of the analog beam former 200, and its output terminals e and f connected respectively to input terminals $I_1$ of the fifth and sixth switches 128 and 129. The gamma sector distributor 123 acts to receive the RF signals over the two forward paths from gamma sector output terminals of the transceiver 10, distribute the received RF signals into the k=6 paths and output the distributed signals respectively to the corresponding switches 126, 127, 128 and 129 and the analog beam former 200 through its output terminals a, b, c, d, e and f. At this time, signals at the output terminals a, b, e and f are passed through the switches 126, 127, 128 and 129, respectively, in a different manner from signals at the output terminals c and d. In this regard, the gamma sector distributor 123 also functions to compensate for phase and amplitude differences between the signals at the output terminals a, b, e and f and the signals at the output terminals c and d.

The first switch 124 in the transmission beam sector allocator 120 acts to receive RF signals from inter-sector variable beam paths of the alpha and beta sector distributors 121 and 122 and switch one of the received RF signals to an alpha sector input path of the analog beam former 200 in response to the switching control signal from the adaptive sector processor 110.

The second switch 125 in the transmission beam sector allocator 120 acts to receive RF signals from other inter-sector variable beam paths of the alpha and beta sector distributors 121 and 122 and switch one of the received RF signals to a beta sector input path of the analog beam former 200 in response to the switching control signal from the adaptive sector processor 110.

The third switch 126 in the transmission beam sector allocator 120 acts to receive RF signals from inter-sector variable beam paths of the beta and gamma sector distributors 122 and 123 and switch one of the received RF signals to another beta sector input path of the analog beam former 200 in response to the switching control signal from the adaptive sector processor 110.

The fourth switch 127 in the transmission beam sector allocator 120 acts to receive RF signals from other inter-sector variable beam paths of the beta and gamma sector distributors 122 and 123 and switch one of the received RF signals to a gamma sector input path of the analog beam former 200 in response to the switching control signal from the adaptive sector processor 110.

The fifth switch 128 in the transmission beam sector allocator 120 acts to receive RF signals from inter-sector variable beam paths of the gamma and alpha sector distributors 123 and 121 and switch one of the received RF signals to another gamma sector input path of the analog beam former 200 in response to the switching control signal from the adaptive sector processor 110.

The sixth switch 129 in the transmission beam sector allocator 120 acts to receive RF signals from other inter-sector variable beam paths of the gamma and alpha sector distributors 123 and 121 and switch one of the received RF signals to another alpha sector input path of the analog beam former 200 in response to the switching control signal from the adaptive sector processor 110.

Figure 5:
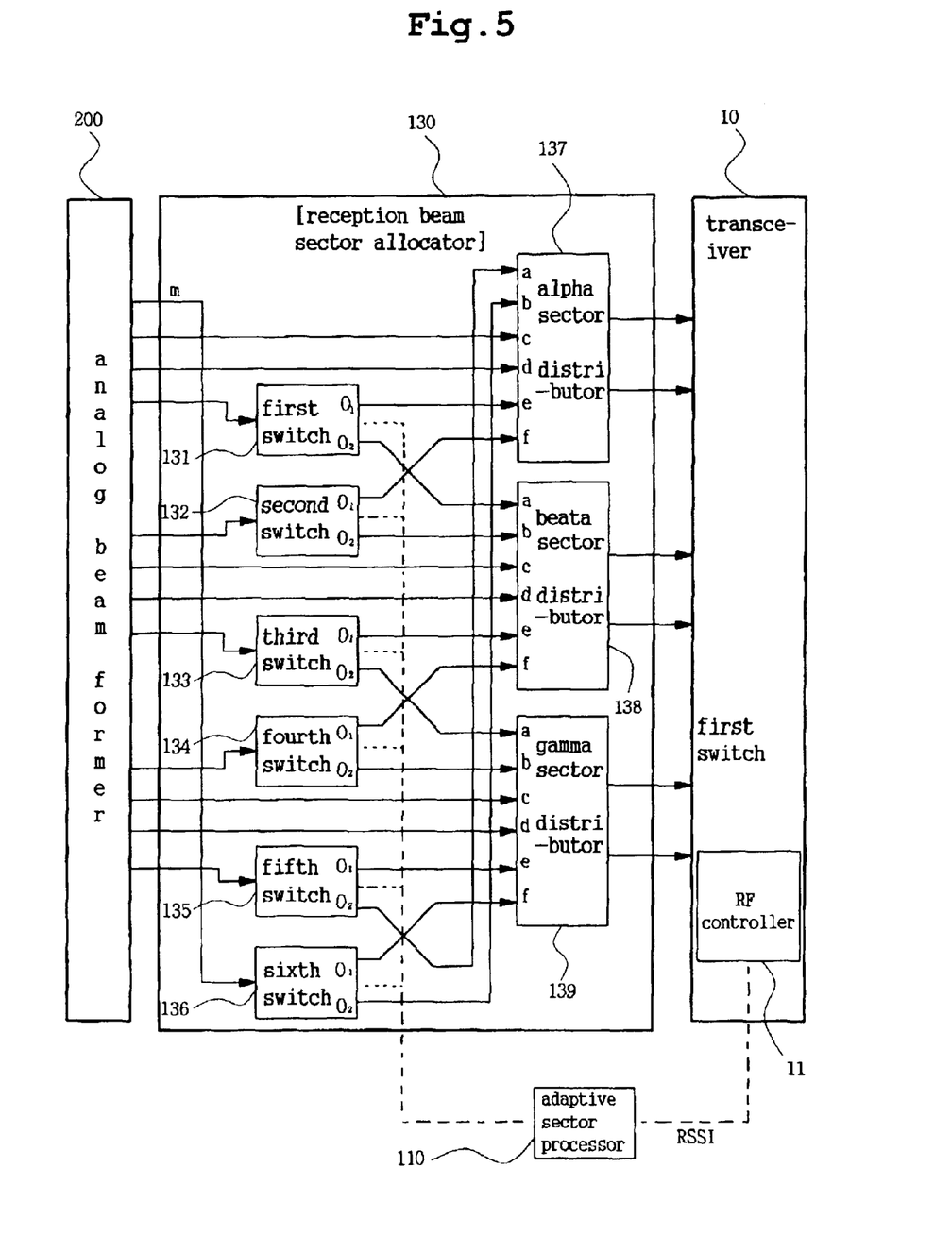
FIG. 5 is a functional block diagram showing an internal structure of a reception beam sector allocator in the cell capacity increasing apparatus of FIG. 3.

The reception beam sector allocator 130 in the adaptive sector unit 100 acts to receive the beam signals of the m reverse paths, containing the y fixed beam paths, for each of the sectors from the analog beam former 200, switch the received beam signals to paths of a corresponding one of the sectors in response to the switching control signal from the adaptive sector processor 110, mix the switched beam signals into ones of the two reverse paths for each of the sectors and output the resulting signals to the transceiver 10. To this end, the reception beam sector allocator 130 includes, as shown in FIG. 5, a first switch 131, a second switch 132, a third switch 133, a fourth switch 134, a fifth switch 135, a sixth switch 136, an alpha sector mixer 137, a beta sector mixer 138 and a gamma sector mixer 139.

The first switch 131 in the reception beam sector allocator 130 acts to receive an RF signal of an alpha sector variable beam from an alpha sector output path of the analog beam former 200 and switch the received RF signal to the alpha sector mixer 137 or beta sector mixer 138 in response to the switching control signal from the adaptive sector processor 110.

The second switch 132 in the reception beam sector allocator 130 acts to receive an RF signal of a beta sector variable beam from a beta sector output path of the analog beam former 200 and switch the received RF signal to the alpha sector mixer 137 or beta sector mixer 138 in response to the switching control signal from the adaptive sector processor 110.

The third switch 133 in the reception beam sector allocator 130 acts to receive an RF signal of a beta sector variable beam from another beta sector output path of the analog beam former 200 and switch the received RF signal to the beta sector mixer 138 or gamma sector mixer 139 in response to the switching control signal from the adaptive sector processor 110.

The fourth switch 134 in the reception beam sector allocator 130 acts to receive an RF signal of a gamma sector variable beam from a gamma sector output path of the analog beam former 200 and switch the received RF signal to the beta sector mixer 138 or gamma sector mixer 139 in response to the switching control signal from the adaptive sector processor 110.

The fifth switch 135 in the reception beam sector allocator 130 acts to receive an RF signal of a gamma sector variable beam from another gamma sector output path of the analog beam former 200 and switch the received RF signal to the gamma sector mixer 139 or alpha sector mixer 137 in response to the switching control signal from the adaptive sector processor 110.

The sixth switch 136 in the reception beam sector allocator 130 acts to receive an RF signal of an alpha sector variable beam from another alpha sector output path of the analog beam former 200 and switch the received RF signal to the gamma sector mixer 139 or alpha sector mixer 137 in response to the switching control signal from the adaptive sector processor 110.

The alpha sector mixer 137 in the reception beam sector allocator 130 has its input terminals a and b connected respectively to output terminals $O_2$ of the fifth and sixth switches 135 and 136, its input terminals c and d connected respectively to alpha fixed beam output terminals of the analog beam former 200, and its input terminals e and f connected respectively to output terminals $O_1$ of the first and second switches 131 and 132. The alpha sector mixer 137 acts to receive beam signals corresponding to the alpha sector from the alpha fixed beam output terminals of the analog beam former 200, the first switch 131 or second switch 132 and the fifth switch 135 or sixth switch 136, mix the received beam signals into ones of the two reverse paths and output the resulting signals to the transceiver 10. At this time, signals at the input terminals a, b, e and f are received through the switches 135, 136, 131 and 132, respectively, in a different manner from signals at the input terminals c and d. In this regard, the alpha sector mixer 137 also functions to compensate for phase and amplitude differences between the signals at the input terminals a, b, e and f and the signals at the input terminals c and d.

The beta sector mixer 138 in the reception beam sector allocator 130 has its input terminals a and b connected respectively to output terminals $O_2$ of the first and second switches 131 and 132, its input terminals c and d connected respectively to beta fixed beam output terminals of the analog beam former 200, and its input terminals e and f connected respectively to output terminals $O_1$ of the third and fourth switches 133 and 134. The beta sector mixer 138 acts to receive beam signals corresponding to the beta sector from the beta fixed beam output terminals of the analog beam former 200, the first switch 131 or second switch 132 and the third switch 133 or fourth switch 134, mix the received beam signals into ones of the two reverse paths and output the resulting signals to the transceiver 10. At this time, signals at the input terminals a, b, e and f are received through the switches 131, 132, 133 and 134, respectively, in a different manner from signals at the input terminals c and d. In this regard, the beta sector mixer 138 also functions to compensate for phase and amplitude differences between the signals at the input terminals a, b, e and f and the signals at the input terminals c and d.

The gamma sector mixer 139 in the reception beam sector allocator 130 has its input terminals a and b connected respectively to output terminals $O_2$ of the third and fourth switches 133 and 134, its input terminals c and d connected respectively to gamma fixed beam output terminals of the analog beam former 200, and its input terminals e and f connected respectively to output terminals $O_1$ of the fifth and sixth switches 135 and 136. The gamma sector mixer 139 acts to receive beam signals corresponding to the gamma sector from the gamma fixed beam output terminals of the analog beam former 200, the third switch 133 or fourth switch 134 and the fifth switch 135 or sixth switch 136, mix the received beam signals into ones of the two reverse paths and output the resulting signals to the transceiver 10. At this time, signals at the input terminals a, b, e and f are received through the switches 133, 134, 135 and 136, respectively, in a different manner from signals at the input terminals c and d. In this regard, the gamma sector mixer 139 also functions to compensate for phase and amplitude differences between the signals at the input terminals a, b, e and f and the signals at the input terminals c and d.

The analog beam former 200 is adapted to, in the forward link, receive the beam signals of the m forward paths for each of the sectors from the adaptive sector unit 100, convert the received beam signals into antenna signals of n forward paths for each of the sectors to form a multibeam of fixed beams y and variable beams x for each of the sectors, and output the resulting antenna signals to the power amplifier 300.

The analog beam former 200 is also adapted to, in the reverse link, receive antenna signals of n reverse paths for each of the sectors from the front-end unit 400, convert the received antenna signals into the beam signals of the m reverse paths and output the resulting beam signals to the adaptive sector unit 100.

The analog beam former 200 includes, as shown in FIG. 3, a transmission analog beam former 210 including a transmission alpha butler matrix 211, transmission beta butler matrix 212 and transmission gamma butler matrix 213, and a reception analog beam former 220 including a reception alpha butler matrix 221, reception beta butler matrix 222 and reception gamma butler matrix 223.

The transmission alpha butler matrix 211 in the transmission analog beam former 210 acts to receive the beam signals of the m forward paths for the alpha sector from the transmission beam sector allocator 120 in the adaptive sector unit 100, mix the received beam signals while making them out of phase from one another, and output the resulting signals to the power amplifier 300 over the n forward paths.

The transmission beta butler matrix 213 in the transmission analog beam former 210 acts to receive the beam signals of the m forward paths for the gamma sector from the transmission beam sector allocator 120 in the adaptive sector unit 100, mix the received beam signals while making them out of phase from one another, and output the resulting signals to the power amplifier 300 over the n forward paths.

The reception alpha butler matrix 221 in the reception analog beam former 220 acts to receive the antenna signals of the n reverse paths for the alpha sector from the front-end unit 400, separate the received antenna signals from one another while phase-shifting them, convert the resulting signals into the beam signals of the m reverse paths and output the converted beam signals to alpha sector input paths of the reception beam sector allocator 130 in the adaptive sector unit 100.

The reception beta butler matrix 222 in the reception analog beam former 220 acts to receive the antenna signals of the n reverse paths for the beta sector from the front-end unit 400, separate the received antenna signals from one another while phase-shifting them, convert the resulting signals into the beam signals of the m reverse paths and output the converted beam signals to beta sector input paths of the reception beam sector allocator 130 in the adaptive sector unit 100.

The reception gamma butler matrix 223 in the reception analog beam former 220 acts to receive the antenna signals of the n reverse paths for the gamma sector from the front-end unit 400, separate the received antenna signals from one another while phase-shifting them, convert the resulting signals into the beam signals of the m reverse paths and output the converted beam signals to gamma sector input paths of the reception beam sector allocator 130 in the adaptive sector unit 100.

The power amplifier 300 is adapted to power-amplify the antenna signals of the n forward paths for each of the sectors from the transmission analog beam former 210 and output the resulting signals to the front-end unit 400. The power amplifier 300 can preferably support multi-array antenna modules 500 of $\lambda=12$.

The front-end unit 400 includes a duplexer, low-noise amplifier, filter, etc., not shown. The front-end unit 400 is adapted to, in the forward link, receive n-path antenna signals of each of the sectors from the power amplifier 300 and transmit the received antenna signals through each of the multi-array antenna modules 500 of $\lambda=12$, namely, each having four antennas for a corresponding one of the sectors.

The front-end unit 400 is further adapted to, in the reverse link, receive n-path antenna signals from each of the multi-array antenna modules 500 of $\lambda=12$, perform noise removal and filtering functions with respect to the received antenna signals and output the resulting signals to the reception analog beam former 220 over the n reverse paths for each of the sectors.

In the present embodiment, the number m of the forward paths and the number m of the reverse paths for each sector between the adaptive sector unit 100 and the analog beam former 200, the number n of the forward paths and the number n of the reverse paths for each sector among the analog beam former 200, the power amplifier 300 and the front-end unit 400, and the number $\lambda/3$ of the antennas for each sector are each set to be the same as the total number of fixed beams y and variable beams z of each sector.

It should be noted that the apparatus for increasing the cell capacity in the mobile communication 3-sector base station system using the adaptive sectorization, constructed as described above, is only one embodiment provided for a better understanding of the present invention. Therefore, with modifications in the number of constituent elements and paths, the present invention is also applicable to a 2-sector base station system or a 6-sector base station system.

Figure 6:
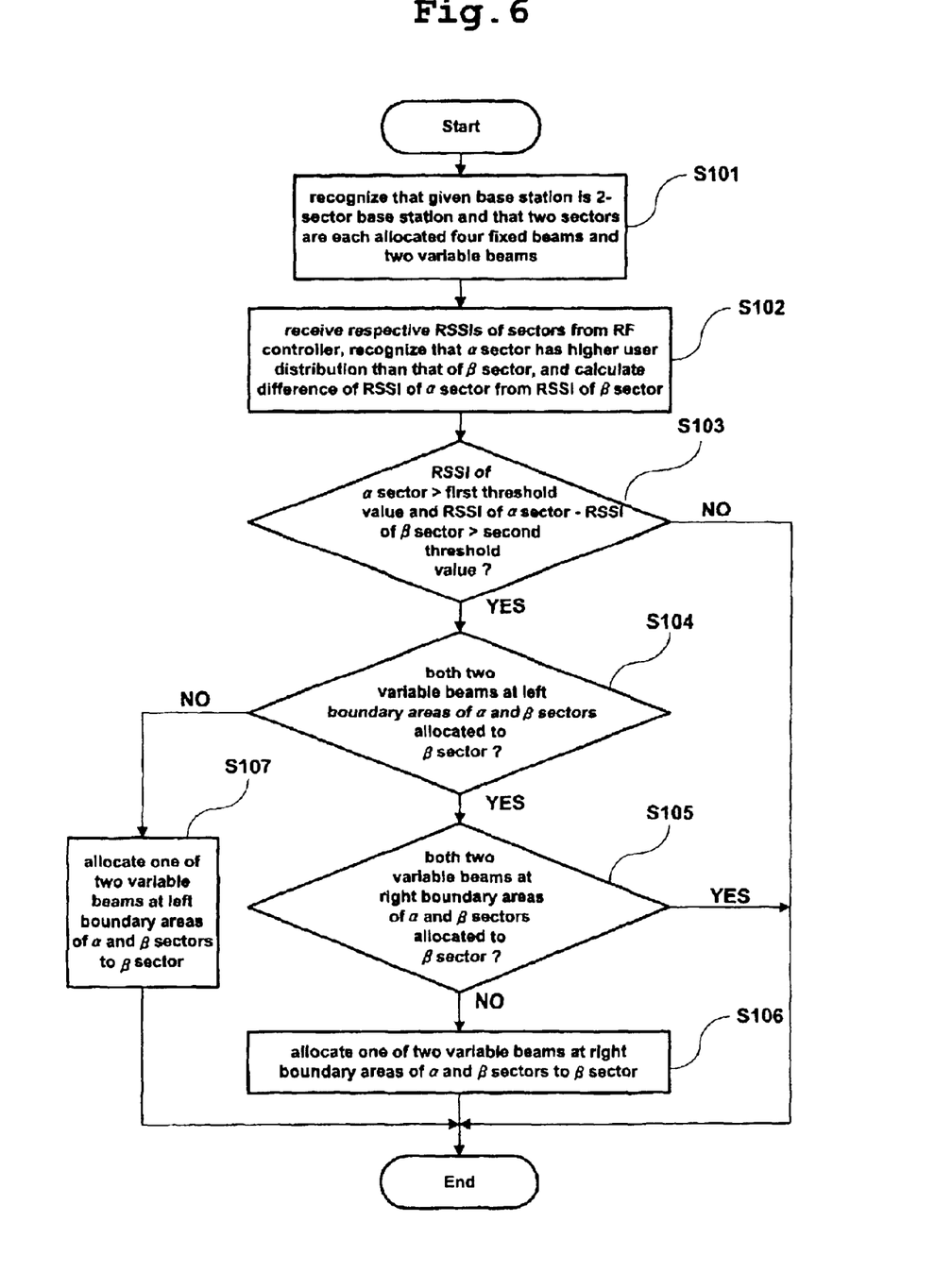
FIG. 6 is a flow chart illustrating a method for controlling an apparatus for increasing a cell capacity in a mobile communication 2-sector base station system using the adaptive sectorization in accordance with an alternative embodiment of the present invention.

Next, a description will be given of a method for controlling an apparatus for increasing a cell capacity in a mobile communication 2-sector base station system using the adaptive sectorization in accordance with an alternative embodiment of the present invention with reference to FIGS. 6 and 7. The entire operation of this second embodiment is substantially the same as that of the above-stated first embodiment, and a description will thus be given of only the variable beam allocation by the adaptive sector processor 110 in the adaptive sector unit 100.

Figure 7:
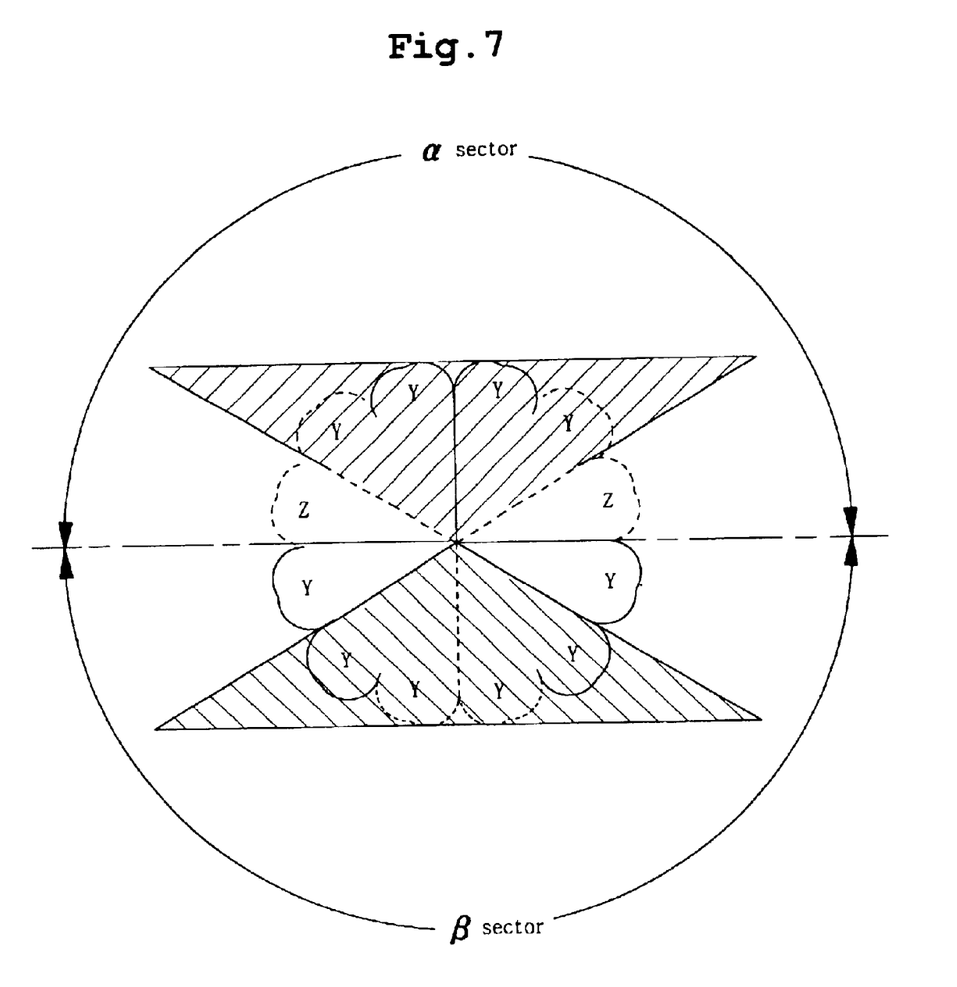
FIG. 7 is a reference diagram illustrating the cell capacity increasing apparatus control method of FIG. 6.

First, the adaptive sector processor 110 in the adaptive sector unit 100 performs an initialization operation to recognize that a given base station is a 2-sector base station having two sectors, an alpha (α) sector and beta (β) sector, as shown in FIG. 7 and that the two sectors are each allocated four fixed beams y and two variable beams z (S101).

Thereafter, the adaptive sector processor 110 receives respective RSSIs of the sectors from the RF controller 11, recognizes on the basis of the received RSSIs that the alpha sector has a higher user distribution than that of the beta sector, and calculates a difference of the RSSI of the beta sector from the RSSI of the alpha sector (S102). In the present embodiment, the alpha sector is defined for illustrative purposes to have a higher user distribution than that of the beta sector.

Subsequently, the adaptive sector processor 110 determines whether the RSSI of the alpha sector is greater than a first predetermined threshold value and the difference of the RSSI of the beta sector from the RSSI of the alpha sector is greater than a second predetermined threshold value (S103). In the present embodiment, the first and second threshold values are arbitrarily set according to environments of the base station and the surrounding environments for provision of an algorithm.

Upon determining at the above step S103 that the RSSI of the alpha sector is not greater than the first predetermined threshold value, or the difference of the RSSI of the beta sector from the RSSI of the alpha sector is not greater than the second predetermined threshold value (NO), the adaptive sector processor 110 ends the algorithm. However, if it is determined at the above step S103 that the RSSI of the alpha sector is greater than the first predetermined threshold value and the difference of the RSSI of the beta sector from the RSSI of the alpha sector is greater than the second predetermined threshold value (YES), the adaptive sector processor 110 determines whether both two variable beams at the left boundary areas of the alpha and beta sectors have been allocated to the beta sector (S104). This variable beam sector allocation determination by the adaptive sector processor 110 at step S104 is made on the basis of switched states of the associated switches in the transmission/reception beam sector allocators 120 and 130.

In the case where it is determined at the above step S104 that both the two variable beams at the left boundary areas of the alpha and beta sectors have been allocated to the beta sector (YES), the adaptive sector processor 110 determines whether both two variable beams at the right boundary areas of the alpha and beta sectors have been allocated to the beta sector (S105).

In the case where it is determined at the above step S105 that neither of the two variable beams at the right boundary areas of the alpha and beta sectors has been allocated to the beta sector (NO), the adaptive sector processor 110 allocates one of the two variable beams at the right boundary areas of the alpha and beta sectors to the beta sector (S106). That is, the adaptive sector processor 110 allocates one of the two variable beams at the right boundary areas of the alpha and beta sectors to the beta sector by controlling a corresponding one of the switches associated with those variable beams.

On the other hand, if it is determined at the above step S104 that neither of the two variable beams at the left boundary areas of the alpha and beta sectors has been allocated to the beta sector (NO), the adaptive sector processor 110 allocates one of the two variable beams at the left boundary areas of the alpha and beta sectors to the beta sector (S107).

Figure 8:
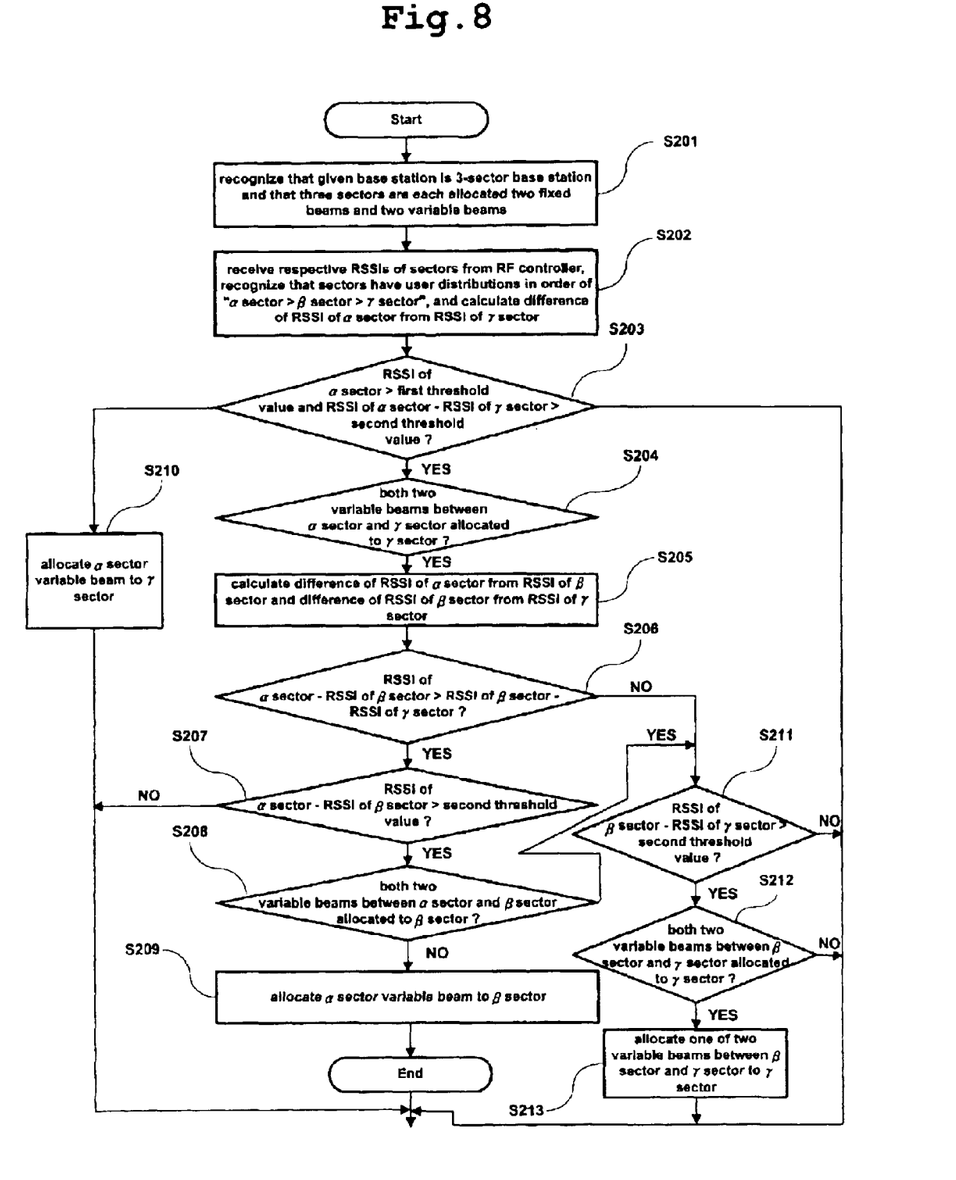
FIG. 8 is a flow chart illustrating a method for controlling the apparatus for increasing the cell capacity in the mobile communication 3-sector base station system using the adaptive sectorization in accordance with the first embodiment of the present invention.

Next, a description will be given of a method for controlling the apparatus for increasing the cell capacity in the mobile communication 3-sector base station system using the adaptive sectorization in accordance with the first embodiment of the present invention with reference to FIGS. 8 and 9.

Figure 9:
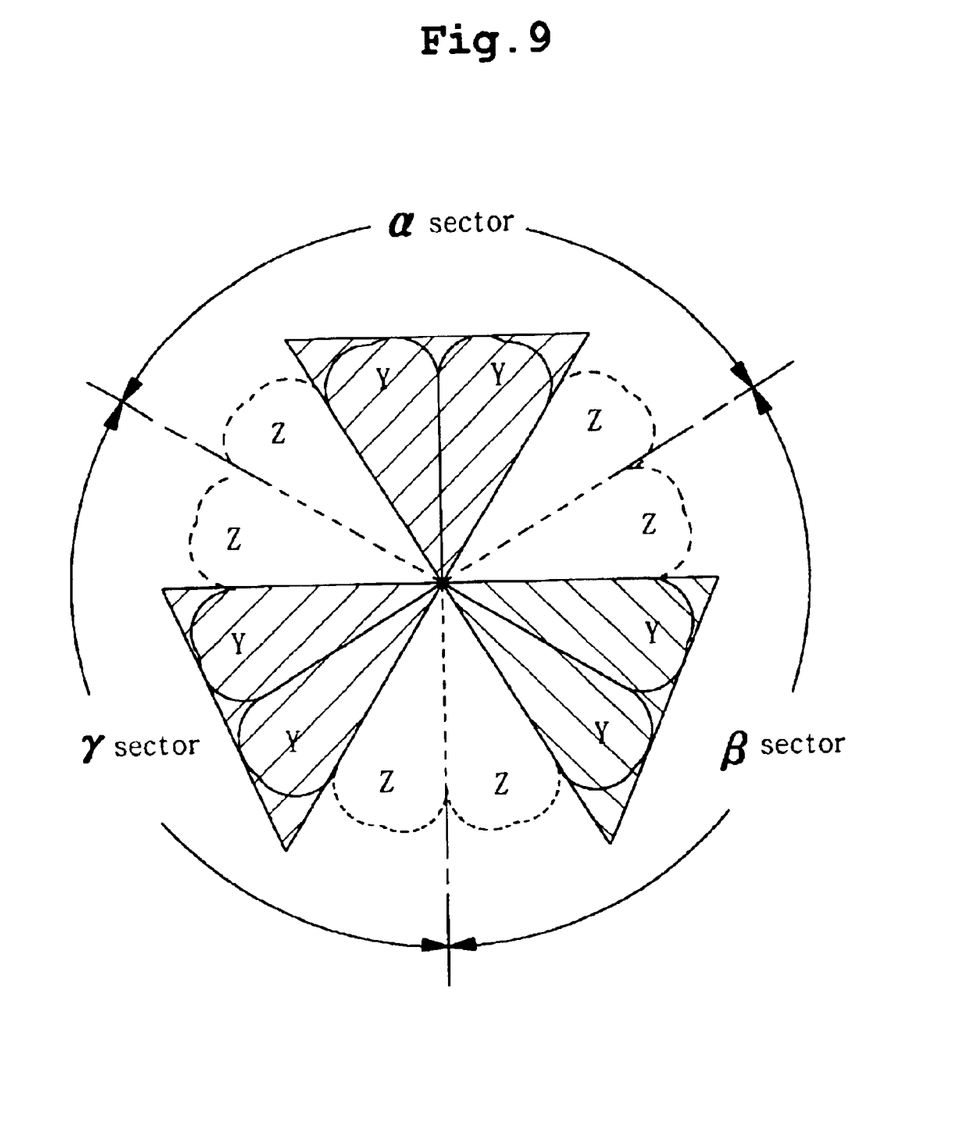
FIG. 9 is a reference diagram illustrating the cell capacity increasing apparatus control method of FIG. 8.

First, the adaptive sector processor 110 in the adaptive sector unit 100 performs an initialization operation to recognize that a given base station is a 3-sector base station having three sectors, an alpha (α) sector, beta (β) sector and gamma (γ) sector, as shown in FIG. 9 and that the three sectors are each allocated two fixed beams and two variable beams (S201).

Thereafter, the adaptive sector processor 110 receives respective RSSIs of the sectors from the RF controller 11, recognizes on the basis of the received RSSIs that the sectors have user distributions in the order of "alpha sector>beta sector>gamma sector", and calculates a difference of the RSSI of the gamma sector from the RSSI of the alpha sector (S202). In the present embodiment, the three sectors are defined for illustrative purposes to have user distributions in the order of "alpha sector>beta sector>gamma sector".

Subsequently, the adaptive sector processor 110 determines whether the RSSI of the alpha sector is greater than a first predetermined threshold value and the difference of the RSSI of the gamma sector from the RSSI of the alpha sector is greater than a second predetermined threshold value (S203).

Upon determining at the above step S203 that the RSSI of the alpha sector is not greater than the first predetermined threshold value, or the difference of the RSSI of the gamma sector from the RSSI of the alpha sector is not greater than the second predetermined threshold value (NO), the adaptive sector processor 110 ends the algorithm. However, if it is determined at the above step S203 that the RSSI of the alpha sector is greater than the first predetermined threshold value and the difference of the RSSI of the gamma sector from the RSSI of the alpha sector is greater than the second predetermined threshold value (YES), the adaptive sector processor 110 determines whether both two variable beams between the alpha sector and the gamma sector have been allocated to the gamma sector (S204).

In the case where it is determined at the above step S204 that both the two variable beams between the alpha sector and the gamma sector have been allocated to the gamma sector (YES), the adaptive sector processor 110 calculates a difference of the RSSI of the beta sector from the RSSI of the alpha sector and a difference of the RSSI of the gamma sector from the RSSI of the beta sector (S205).

Subsequently, the adaptive sector processor 110 determines whether the difference of the RSSI of the beta sector from the RSSI of the alpha sector is greater than the difference of the RSSI of the gamma sector from the RSSI of the beta sector (S206).

Upon determining at the above step S206 that the difference of the RSSI of the beta sector from the RSSI of the alpha sector is greater than the difference of the RSSI of the gamma sector from the RSSI of the beta sector (YES), the adaptive sector processor 110 determines whether the difference of the RSSI of the beta sector from the RSSI of the alpha sector is greater than the second threshold value (S207).

Upon determining at the above step S207 that the difference of the RSSI of the beta sector from the RSSI of the alpha sector is not greater than the second threshold value (NO), the adaptive sector processor 110 ends the algorithm. However, if the difference of the RSSI of the beta sector from the RSSI of the alpha sector is determined at the above step S207 to be greater than the second threshold value (YES), the adaptive sector processor 110 determines whether both two variable beams between the alpha sector and the beta sector have been allocated to the beta sector (S208).

In the case where it is determined at the above step S208 that neither of the two variable beams between the alpha sector and the beta sector has been allocated to the beta sector (NO), the adaptive sector processor 110 allocates one of those two variable beams belonging to the alpha sector to the beta sector (S209).

On the other hand, if it is determined at the above step S204 that neither of the two variable beams between the alpha sector and the gamma sector has been allocated to the gamma sector (NO), the adaptive sector processor 110 allocates one of those two variable beams belonging to the alpha sector to the gamma sector and then ends the algorithm (S210).

Meanwhile, if it is determined at the above step S206 that the difference of the RSSI of the beta sector from the RSSI of the alpha sector is not greater than the difference of the RSSI of the gamma sector from the RSSI of the beta sector (NO), or if it is determined at the above step S208 that both the two variable beams between the alpha sector and the beta sector have been allocated to the beta sector (YES), the adaptive sector processor 110 determines whether the difference of the RSSI of the gamma sector from the RSSI of the beta sector is greater than the second threshold value (S211).

In the case where it is determined at the above step S211 that the difference of the RSSI of the gamma sector from the RSSI of the beta sector is not greater than the second threshold value (NO), the adaptive sector processor 110 ends the algorithm. However, if the difference of the RSSI of the gamma sector from the RSSI of the beta sector is determined at the above step S211 to be greater than the second threshold value (YES), the adaptive sector processor 110 determines whether both two variable beams between the beta sector and the gamma sector have been allocated to the gamma sector (S212).

In the case where it is determined at the above step S212 that neither of the two variable beams between the beta sector and the gamma sector has been allocated to the gamma sector (NO), the adaptive sector processor 110 ends the algorithm. However, if both the two variable beams between the beta sector and the gamma sector are determined at the above step S212 to have been allocated to the gamma sector (YES), the adaptive sector processor 110 allocates one of those two variable beams to the gamma sector (S213).

As apparent from the above description, the present invention provides an apparatus for increasing a cell capacity in a mobile communication system using an adaptive sectorization and a method for controlling the same. According to the present invention, the adaptive sectorization is applied to a mobile communication base station to improve an inter-sector traffic imbalance resulting from a user distribution in a cell so as to increase the cell capacity.

Further, according to the present invention, an analog beam former is used for application of the adaptive sectorization to a mobile communication base station so that the adaptive sectorization is applicable with no modification of internal constituent elements of the base station to curtail hardware costs. Moreover, the analog beam former is used at a stage preceding a power amplifier to reduce a phase error.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for increasing a cell capacity in a mobile communication system using an adaptive sectorization, said mobile communication system including a base station system having a plurality of sectors, said base station system including a transceiver for performing a variety of functions associated with transmission/reception of data, said transceiver including a radio frequency (RF) controller, said apparatus comprising:

an adaptive sector unit for determining a user distribution of each of said sectors on the basis of a received signal strength indicator (RSSI) of each of said sectors from said RF controller, for, in a forward link, receiving RF signals of two forward paths for each of said sectors from said transceiver, switching paths corresponding to variable beams of each of said sectors from one of said sectors with a highest one of the user distributions to another one of said sectors with a lowest one of the user distributions in consideration of the respective user distributions of said sectors to generate beam signals of m forward paths for each of said sectors, and outputting the generated beam signals, and for, in a reverse link, receiving beam signals of m reverse paths, containing y fixed beam paths, for each of said sectors, mixing the received beam signals into ones of two reverse paths and outputting the resulting signals to said transceiver;

an analog beam former for, in said forward link, receiving said beam signals of said m forward paths for each of said sectors from said adaptive sector unit, converting the received beam signals into antenna signals of n forward paths for each of said sectors to form a multibeam of fixed beams and variable beams for each of said sectors, and outputting the resulting antenna signals, and for, in said reverse link, receiving antenna signals of n reverse paths for each of said sectors, converting the received antenna signals into said beam signals of said m reverse paths and outputting the resulting beam signals to said adaptive sector unit;

a power amplifier for power-amplifying said antenna signals of said n forward paths for each of said sectors from said analog beam former and outputting the resulting signals; and a front-end unit for, in said forward link, receiving n-path antenna signals of each of said sectors from said power amplifier and transmitting the received antenna signals through $\lambda/3$ antennas for each of said sectors, and for, in said reverse link, receiving n-path antenna signals from said $\lambda/3$ antennas for each of said sectors, performing noise removal and filtering functions with respect to the received antenna signals and outputting the resulting signals to said analog beam former over said n reverse paths for each of said sectors.

2. The apparatus as set forth in claim 1, wherein the number m of said forward paths and the number m of said reverse paths for each of said sectors, the number n of said forward paths and the number n of said reverse paths for each of said sectors, and the number $\lambda/3$ of said antennas for each of said sectors are each set to be the same as the total number of said fixed beams and variable beams of each of said sectors.

3. The apparatus as set forth in claim 1, wherein said adaptive sector unit includes:

an adaptive sector processor for determining the user distribution of each of said sectors on the basis of said RSSI of each of said sectors from said RF controller and generating and outputting a switching control signal in accordance with the determined result to switch said paths corresponding to said variable beams of each of said sectors;

a transmission beam sector allocator for receiving said RF signals from said transceiver over said two forward paths for each of said sectors, distributing the received RF signals into the same number of paths for each of said sectors as the total number (k) of said fixed beams and variable beams of each of said sectors and neighbor sector variable beams, switching said paths corresponding to said variable beams of each of said sectors in response to said switching control signal from said adaptive sector processor to generate said beam signals of said m forward paths for each of said sectors, and outputting the generated beam signals to said analog beam former; and a reception beam sector allocator for receiving said beam signals of said m reverse paths, containing said y fixed beam paths, for each of said sectors from said analog beam former, switching the received beam signals to paths of a corresponding one of said sectors in response to said switching control signal from said adaptive sector processor, mixing the switched beam signals into ones of said two reverse paths for each of said sectors and outputting the resulting signals to said transceiver.

4. The apparatus as set forth in claim 3, wherein said transmission beam sector allocator includes:

an alpha sector distributor for receiving said RF signals over said two forward paths from alpha sector output terminals of said transceiver, adjusting phases and amplitudes of the received RF signals such that signals inputted to said analog beam former are the same in phase and amplitude, and distributing the resulting signals into said k paths;

a beta sector distributor for receiving said RF signals over said two forward paths from beta sector output terminals of said transceiver, adjusting phases and amplitudes of the received RF signals such that signals inputted to said analog beam former are the same in phase and amplitude, and distributing the resulting signals into said k paths;

a gamma sector distributor for receiving said RF signals over said two forward paths from gamma sector output terminals of said transceiver, adjusting phases and amplitudes of the received RF signals such that signals inputted to said analog beam former are the same in phase and amplitude, and distributing the resulting signals into said k paths;

a first switch for receiving RF signals from inter-sector variable beam paths of said alpha and beta sector distributors and switching one of the received RF signals to an alpha sector input path of said analog beam former in response to said switching control signal from said adaptive sector processor;

a second switch for receiving RF signals from other inter-sector variable beam paths of said alpha and beta sector distributors and switching one of the received RF signals to a beta sector input path of said analog beam former in response to said switching control signal from said adaptive sector processor;

a third switch for receiving RF signals from inter-sector variable beam paths of said beta and gamma sector distributors and switching one of the received RF signals to another beta sector input path of said analog beam former in response to said switching control signal from said adaptive sector processor;

a fourth switch for receiving RF signals from other inter-sector variable beam paths of said beta and gamma sector distributors and switching one of the received RF signals to a gamma sector input path of said analog beam former in response to said switching control signal from said adaptive sector processor;

a fifth switch for receiving RF signals from inter-sector variable beam paths of said gamma and alpha sector distributors and switching one of the received RF signals to another gamma sector input path of said analog beam former in response to said switching control signal from said adaptive sector processor; and a sixth switch for receiving RF signals from other inter-sector variable beam paths of said gamma and alpha sector distributors and switching one of the received RF signals to another alpha sector input path of said analog beam former in response to said switching control signal from said adaptive sector processor.

5. The apparatus as set forth in claim 3, wherein said reception beam sector allocator includes:

a first switch for receiving an RF signal of an alpha sector variable beam from an alpha sector output path of said analog beam former and switching the received RF signal to a first alpha or beta sector input path in response to said switching control signal from said adaptive sector processor;

a second switch for receiving an RF signal of a beta sector variable beam from a beta sector output path of said analog beam former and switching the received RF signal to a second alpha or beta sector input path in response to said switching control signal from said adaptive sector processor;

a third switch for receiving an RF signal of a beta sector variable beam from another beta sector output path of said analog beam former and switching the received RF signal to a third beta sector input path or a first gamma sector input path in response to said switching control signal from said adaptive sector processor;

a fourth switch for receiving an RF signal of a gamma sector variable beam from a gamma sector output path of said analog beam former and switching the received RF signal to a fourth beta sector input path or a second gamma sector input path in response to said switching control signal from said adaptive sector processor;

a fifth switch for receiving an RF signal of a gamma sector variable beam from another gamma sector output path of said analog beam former and switching the received RF signal to a third gamma or alpha sector input path in response to said switching control signal from said adaptive sector processor;

a sixth switch for receiving an RF signal of an alpha sector variable beam from another alpha sector output path of said analog beam former and switching the received RF signal to a fourth gamma or alpha sector input path in response to said switching control signal from said adaptive sector processor;

an alpha sector mixer for receiving alpha sector beam signals from alpha fixed beam output paths of said analog beam former, said first switch or second switch and said fifth switch or sixth switch, adjusting phases and amplitudes of the received alpha sector beam signals such that they are the same in phase and amplitude, mixing the resulting signals into ones of said two reverse paths and outputting the mixed signals to said transceiver;

a beta sector mixer for receiving beta sector beam signals from beta fixed beam output paths of said analog beam former, said first switch or second switch and said third switch or fourth switch, adjusting phases and amplitudes of the received beta sector beam signals such that they are the same in phase and amplitude, mixing the resulting signals into ones of said two reverse paths and outputting the mixed signals to said transceiver; and a gamma sector mixer for receiving gamma sector beam signals from gamma fixed beam output paths of said analog beam former, said third switch or fourth switch and said fifth switch or sixth switch, adjusting phases and amplitudes of the received gamma sector beam signals such that they are the same in phase and amplitude, mixing the resulting signals into ones of said two reverse paths and outputting the mixed signals to said transceiver.

6. The apparatus as set forth in claim 1, wherein said analog beam former includes:
   a transmission analog beam former including a transmission alpha butler matrix for receiving alpha sector beam signals of said m forward paths from said adaptive sector unit, mixing the received beam signals while making them out of phase from one another, and outputting the resulting signals to said power amplifier over said n forward paths, a transmission beta butler matrix for receiving beta sector beam signals of said m forward paths from said adaptive sector unit, mixing the received beam signals while making them out of phase from one another, and outputting the resulting signals to said power amplifier over said n forward paths, and a transmission gamma butler matrix for receiving gamma sector beam signals of said m forward paths from said adaptive sector unit, mixing the received beam signals while making them out of phase from one another, and outputting the resulting signals to said power amplifier over said n forward paths; and
   a reception analog beam former including a reception alpha butler matrix for receiving alpha sector antenna signals of said n reverse paths from said front-end unit, separating the received antenna signals from one another while phase-shifting them, converting the resulting signals into said beam signals of said m reverse paths and outputting the converted beam signals to alpha sector input paths of said adaptive sector unit, a reception beta butler matrix for receiving beta sector antenna signals of said n reverse paths from said front-end unit, separating the received antenna signals from one another while phase-shifting them, converting the resulting signals into said beam signals of said m reverse paths and outputting the converted beam signals to beta sector input paths of said adaptive sector unit, and a reception gamma butler matrix for receiving gamma sector antenna signals of said n reverse paths from said front-end unit, separating the received antenna signals from one another while phase-shifting them, converting the resulting signals into said beam signals of said m reverse paths and outputting the converted beam signals to gamma sector input paths of said adaptive sector unit.

7. The apparatus as set forth in claim 1, wherein the number $\lambda/3$ of said antennas for each of said sectors is set to be the same as the total number of said fixed beams and variable beams of each of said sectors, said $\lambda/3$ antennas for each of said sectors constituting a multi-array antenna module.

8. The apparatus as set forth in claim 1, wherein said apparatus is configured to be applicable to any one of a 2-sector base station, a 3-sector base station or a 6-sector base station.

9. A method for controlling an apparatus for increasing a cell capacity in a mobile communication system using an adaptive sectorization, by means of an adaptive sector processor of an adaptive sector unit, said method comprising the steps of:
   a) recognizing that a given base station is a 2-sector base station having an alpha sector and a beta sector and that said alpha sector and beta sector are each allocated four fixed beams and two variable beams;
   b) receiving respective RSSIs of said sectors from an RF controller, recognizing on the basis of the received RSSIs that said alpha sector has a higher user distribution than that of said beta sector, and calculating a difference of said RSSI of said beta sector from said RSSI of said alpha sector;
   c) determining whether said RSSI of said alpha sector is greater than a first predetermined threshold value and said difference of said RSSI of said beta sector from said RSSI of said alpha sector is greater than a second predetermined threshold value;
   d) ending an entire operation if it is determined at said step c) that said RSSI of said alpha sector is not greater than said first predetermined threshold value, or said difference of said RSSI of said beta sector from said RSSI of said alpha sector is not greater than said second predetermined threshold value, and determining whether both two variable beams at left boundary areas of said alpha and beta sectors have been allocated to said beta sector, if it is determined at said step c) that said RSSI of said alpha sector is greater than said first predetermined threshold value and said difference of said RSSI of said beta sector from said RSSI of said alpha sector is greater than said second predetermined threshold value;
   e) determining whether both two variable beams at right boundary areas of said alpha and beta sectors have been allocated to said beta sector, if it is determined at said step d) that both said two variable beams at said left boundary areas of said alpha and beta sectors have been allocated to said beta sector; and
   f) allocating one of said two variable beams at said right boundary areas of said alpha and beta sectors to said beta sector if it is determined at said step e) that neither of said two variable beams at said right boundary areas of said alpha and beta sectors has been allocated to said beta sector.

10. The method as set forth in claim 9, further comprising the step of:
   g) allocating one of said two variable beams at said left boundary areas of said alpha and beta sectors to said beta sector if it is determined at said step d) that neither of said two variable beams at said left boundary areas of said alpha and beta sectors has been allocated to said beta sector.

11. A method for controlling an apparatus for increasing a cell capacity in a mobile communication system using an adaptive sectorization, by means of an adaptive sector processor of an adaptive sector unit, said method comprising the steps of:
   a) recognizing that a given base station is a 3-sector base station having an alpha sector, a beta sector and a gamma sector and that said alpha sector, beta sector and gamma sector are each allocated two fixed beams and two variable beams;
   b) receiving respective RSSIs of said sectors from an RF controller, recognizing on the basis of the received RSSIs that said sectors have user distributions in the order of "alpha sector>beta sector>gamma sector", and calculating a difference of said RSSI of said gamma sector from said RSSI of said alpha sector;
   c) determining whether said RSSI of said alpha sector is greater than a first predetermined threshold value and said difference of said RSSI of said gamma sector from said RSSI of said alpha sector is greater than a second predetermined threshold value;
   d) ending an entire operation if it is determined at said step c) that said RSSI of said alpha sector is not greater than said first predetermined threshold value, or said difference of said RSSI of said gamma sector from said RSSI of said alpha sector is not greater than said second predetermined threshold value, and determining whether both two variable beams between said alpha sector and said gamma sector have been allocated to said gamma sector, if it is determined at said step c) that said RSSI of said alpha sector is greater than said first predetermined threshold value and said difference of said RSSI of said gamma sector from said RSSI of said alpha sector is greater than said second predetermined threshold value;

e) calculating a difference of said RSSI of said beta sector from said RSSI of said alpha sector and a difference of said RSSI of said gamma sector from said RSSI of said beta sector if it is determined at said step d) that both said two variable beams between said alpha sector and said gamma sector have been allocated to said gamma sector;

f) determining whether said difference of said RSSI of said beta sector from said RSSI of said alpha sector is greater than said difference of said RSSI of said gamma sector from said RSSI of said beta sector;

g) determining whether said difference of said RSSI of said beta sector from said RSSI of said alpha sector is greater than said second threshold value, if it is determined at said step f) that said difference of said RSSI of said beta sector from said RSSI of said alpha sector is greater than said difference of said RSSI of said gamma sector from said RSSI of said beta sector;

h) ending the entire operation if it is determined at said step g) that said difference of said RSSI of said beta sector from said RSSI of said alpha sector is not greater than said second threshold value, and determining whether both two variable beams between said alpha sector and said beta sector have been allocated to said beta sector, if it is determined at said step g) that said difference of said RSSI of said beta sector from said RSSI of said alpha sector is greater than said second threshold value; and i) allocating one of said two variable beams between said alpha sector and said beta sector belonging to said alpha sector to said beta sector if it is determined at said step h) that neither of said two variable beams between said alpha sector and said beta sector has been allocated to said beta sector.

12. The method as set forth in claim 11, further comprising the step of:

j) allocating one of said two variable beams between said alpha sector and said gamma sector belonging to said alpha sector to said gamma sector and then ending the entire operation, if it is determined at said step d) that neither of said two variable beams between said alpha sector and said gamma sector has been allocated to said gamma sector.

13. The method as set forth in claim 11, further comprising the steps of:

j) determining whether said difference of said RSSI of said gamma sector from said RSSI of said beta sector is greater than said second threshold value, if it is determined at said step f) that said difference of said RSSI of said beta sector from said RSSI of said alpha sector is not greater than said difference of said RSSI of said gamma sector from said RSSI of said beta sector, or if it is determined at said step h) that both said two variable beams between said alpha sector and said beta sector have been allocated to said beta sector;

k) ending the entire operation if it is determined at said step j) that said difference of said RSSI of said gamma sector from said RSSI of said beta sector is not greater than said second threshold value, and determining whether both two variable beams between said beta sector and said gamma sector have been allocated to said gamma sector, if it is determined at said step j) that said difference of said RSSI of said gamma sector from said RSSI of said beta sector is greater than said second threshold value; and l) ending the entire operation if it is determined at said step k) that neither of said two variable beams between said beta sector and said gamma sector has been allocated to said gamma sector, and allocating one of said two variable beams between said beta sector and said gamma sector to said gamma sector if it is determined at said step k) that both said two variable beams between said beta sector and said gamma sector have been allocated to said gamma sector.

* * * * *